US009411442B2

(12) United States Patent
Alameh et al.

(10) Patent No.: US 9,411,442 B2
(45) Date of Patent: Aug. 9, 2016

(54) ELECTRONIC DEVICE HAVING MANAGED INPUT COMPONENTS

(75) Inventors: Rachid M. Alameh, Crystal Lake, IL (US); Timothy Dickinson, Crystal Lake, IL (US); Robert A. Zurek, Antioch, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/569,489

(22) Filed: Aug. 8, 2012

(65) Prior Publication Data
US 2014/0043295 A1 Feb. 13, 2014

(51) Int. Cl.
G06F 3/042 (2006.01)
G06F 3/041 (2006.01)

(52) U.S. Cl.
CPC .............. *G06F 3/041* (2013.01); *G06F 3/0416* (2013.01); *G06F 3/0418* (2013.01); *G06F 2203/04105* (2013.01)

(58) Field of Classification Search
CPC ....................................................... G06F 3/041
USPC ............................................................ 345/175
See application file for complete search history.

(56) References Cited

U.S. PATENT DOCUMENTS

| 5,563,632 | A | 10/1996 | Roberts |
| 6,492,979 | B1 | 12/2002 | Kent et al. |
| 6,504,530 | B1 * | 1/2003 | Wilson et al. ................. 345/173 |
| 7,401,300 | B2 | 7/2008 | Nurmi |
| 7,616,191 | B2 | 11/2009 | Matta |
| 7,623,118 | B2 | 11/2009 | Skillman et al. |
| 7,656,394 | B2 | 2/2010 | Westerman et al. |
| 7,706,916 | B2 | 4/2010 | Hilton |
| 7,726,452 | B2 | 6/2010 | Kraner et al. |

(Continued)

FOREIGN PATENT DOCUMENTS

| EP | 1993030 A1 | 11/2008 |
| GP | 2288665 A | 10/1995 |

(Continued)

OTHER PUBLICATIONS

Patent Cooperation Treaty, "PCT Search Report and Written Opinion of the International Searching Authority" for International Application No. PCT/US2012/042117 dated Oct. 5, 2012, 11 pages.

(Continued)

*Primary Examiner* — Jason Olson
(74) *Attorney, Agent, or Firm* — Wolfe-SBMC

(57) ABSTRACT

There is described an electronic device having a touch-sensitive sensor and a piezoelectric sensor, and a method of operating the device. The electronic device detects an actuation of the touch-sensitive sensor, and a touch-sensitive signal is produced by the touch-sensitive sensor in response to detecting the actuation of the touch-sensitive sensor. Also, the electronic device detects an actuation of the piezoelectric sensor, and a piezoelectric signal is produced by the piezoelectric sensor in response to detecting the actuation of the piezoelectric sensor. Next, the electronic device determines whether the actuation of the touch-sensitive sensor is invalid based on the touch-sensitive signal and the piezoelectric signal. The electronic device then performs, or refrains from performing, an operation in response to determining that the actuation of the touch-sensitive sensor is invalid.

12 Claims, 4 Drawing Sheets

(56) References Cited

U.S. PATENT DOCUMENTS

| | | | |
|---|---|---|---|
| 8,184,423 B2 | 5/2012 | Rothkopf | |
| 8,269,731 B2 | 9/2012 | Molne | |
| 8,310,457 B2 | 11/2012 | Faubert et al. | |
| 9,164,605 B1 * | 10/2015 | Pirogov | G06F 3/041 |
| 2002/0175836 A1 | 11/2002 | Roberts | |
| 2004/0021643 A1 * | 2/2004 | Hoshino et al. | 345/173 |
| 2006/0119313 A1 | 6/2006 | Chang | |
| 2006/0279548 A1 | 12/2006 | Geaghan | |
| 2007/0085157 A1 | 4/2007 | Fadell et al. | |
| 2007/0100666 A1 | 5/2007 | Stivoric et al. | |
| 2007/0216655 A1 | 9/2007 | Chen et al. | |
| 2008/0132313 A1 | 6/2008 | Rasmussen et al. | |
| 2008/0136662 A1 | 6/2008 | Bellows et al. | |
| 2009/0152984 A1 | 6/2009 | Yamada et al. | |
| 2009/0189873 A1 | 7/2009 | Peterson et al. | |
| 2009/0209285 A1 | 8/2009 | McMahan | |
| 2009/0262078 A1 | 10/2009 | Pizzi | |
| 2009/0278805 A1 | 11/2009 | Kao et al. | |
| 2010/0053116 A1 * | 3/2010 | Daverman et al. | 345/175 |
| 2010/0090973 A1 | 4/2010 | Algreatly | |
| 2010/0141601 A1 | 6/2010 | Kim et al. | |
| 2010/0152545 A1 | 6/2010 | Ramsay et al. | |
| 2010/0277454 A1 | 11/2010 | Gettemy et al. | |
| 2011/0050619 A1 | 3/2011 | Griffin | |
| 2011/0133934 A1 | 6/2011 | Tan et al. | |
| 2011/0291951 A1 | 12/2011 | Tong | |
| 2011/0306304 A1 | 12/2011 | Forutanpour et al. | |

FOREIGN PATENT DOCUMENTS

| | | | |
|---|---|---|---|
| WO | 0235460 A1 | 5/2002 | |
| WO | 2004037497 A1 | 5/2004 | |
| WO | 2006133018 A2 | 12/2006 | |
| WO | 2010026395 A1 | 3/2010 | |
| WO | 2011008629 A1 | 1/2011 | |

OTHER PUBLICATIONS

National Computer Solutions "Environmental Sensors Hubs", Aug. 10, 2010, pp. 1-3, http://www.ncs-us.com.sensorhubs.htm.

Jerome Pasquero, et al, "A Haptic Wristwatch for Eyes-Free Interactions", CHI 2011 Session: Tactile Interaction, May 7-11, 2011, Vancouver BC Canada, pp. 3257-3266.

Rachid M. Alameh, et al., "Method and Apparatus for a Touch and Nudge Interface", U.S. Appl. No. 12/982,428, filed Dec. 30, 2010.

Patent Cooperation Treaty, "PCT Search Report and Written Opinion of the International Searching Authority" for International Application No. PCT/US2011/066539, Mar. 20, 2012, 9 pages.

John H. Krahenbuhl, et al, "A Portable Electronic Device Having Interchangeable User Interfaced and Method Thereof", U.S. Appl. No. 13/172,502, filed Jun. 29, 2011.

Rachid M. Alameh, et al, "System and Method for Reducing Occurences of Unintended Operations in an Electronic Device", U.S. Appl. No. 13/346,298, filed Jan. 9, 2012.

Azstarnet.com, "Disabled Control Computer with their Breath", Sep. 27, 2010, 2 pages, http://azstarnet.com/news/science/health-med-fit/article_2759e0d1-2a77-...1.

Anonymous: "Technology Comparison: Surface Acoustic Wave, Optical and Bending Wave Technology", 2009, XP055064086.

Patent Cooperation Treaty, "PCT Search Report and Written Opinion of the International Searching Authority" for International Application No. PCT/US2012/069391, Jun. 6, 2013, 14 pages.

United States Patent and Trademark Office, "Non-Final Rejection" for U.S. Appl. No. 13/172,502 dated Aug. 27, 2013, 11 pages.

United States Patent and Trademark Office, "Non-Final Rejection" for U.S. Appl. No. 13/346,298 dated Sep. 13, 2013, 10 pages.

United States Patent and Trademark Office, "Non-Final Rejection" for U.S. Appl. No. 13/346,298 dated Apr. 7, 2014, 9 pages.

European Patent Office, International Search Report and the Written Opinion in International Patent Application PCT/US2013/053371 (Mar. 13, 2014).

International Bureau of WIPO, International Preliminary Report on Patentability in International Patent Application PCT/US2013/053371 (Feb. 19, 2015).

* cited by examiner

ELECTRONIC DEVICE HAVING MANAGED INPUT COMPONENTS

CROSS REFERENCE TO RELATED APPLICATIONS

The present application relates to co-pending and commonly assigned U.S. application Ser. No. 13/172,502, filed on Jun. 29, 2011, and U.S. application Ser. No. 13/346,298, filed on Jan. 9, 2012, the contents of which are incorporated herein by reference.

FIELD OF THE INVENTION

The present invention relates to electronic devices having multiple input components and, more particularly, to electronic devices and methods that reduce the extent to which such substandard sensing conditions fail to produce desired consequences for a user.

BACKGROUND OF THE INVENTION

Electronic devices, and particularly portable electronic devices, can include a variety of different types of actuators depending upon the embodiment. Occasionally events occur that fail to cause desirable actuation or triggering of an electronic device actuator. For example, a electronic device in a certain environment may come in contact with elements of the environment, such as moisture or other foreign matter, and thus cause or hinder operation of an actuator of the electronic device. Such events can be undesirable for various reasons. Among other things, such events can, in turn, cause the electronic device to fail to take desired actions or produce consequences that are unintended or undesirable to the user. For example, the moisture or other foreign matter in contact with the actuator of the electronic device may unintentionally cause the device to operate in a less-than-optimal manner.

DETAILED DESCRIPTION OF THE EMBODIMENTS

Figure 1:
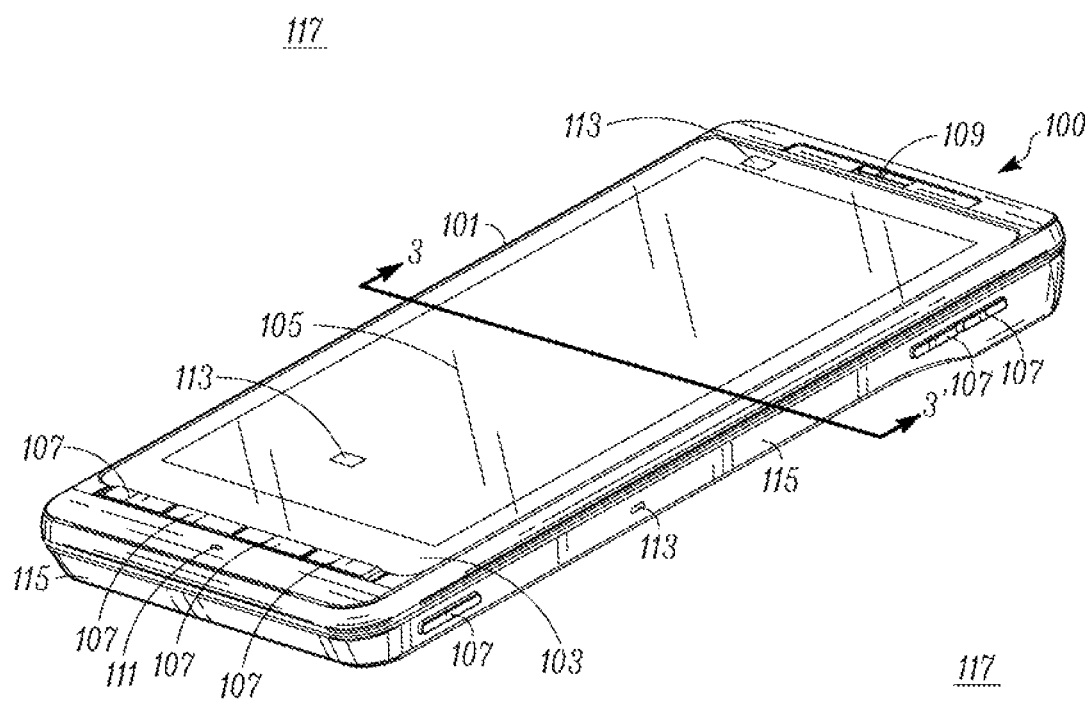
FIG. 1 is a perspective view representing an example electronic device having, among other things, a touch-sensitive sensor and a piezoelectric sensor.

In at least some embodiments, an electronic device employs a system and/or method by which the device classifies actuation events experienced by a touch screen (or possibly other sensor) into two different types, namely, valid and invalid actuation events. Both the valid and invalid actuation events are events that can occur (or can be triggered) as a result of different types of motions, forces or environmental conditions experienced by the device and, thus, experienced by the user interface. Upon distinguishing between valid and invalid actuation events, the device in turn varies its performance accordingly, so that operation of the device is appropriate to reflect the device's analysis of whether any particular actuation event was intended by the device and/or user. As a result of such operation, undesired or unintended operations of the device, failure to perform desired operations and corresponding consequences may be reduced.

Depending upon the embodiment, to classify different actuation events, the device may consider one or more of a variety of sensory data (e.g., piezoelectric, accelerometer, gyro, and other embedded sensor data). The device may also consider operational mode data, other contextual data, and/or other data such as user settings, specifications, or preferences. Thus, for example, the device may use any of a variety of operational mode, background environment, environmental condition, device location, device position, device speed, device carry mode, manner of device handling, device use history, user specification, and other types of data to assist in determining whether a particular actuation event should be classified as valid or invalid.

One aspect is an electronic device comprising a user interface surface, a touch-sensitive sensor associated with the user interface surface, a piezoelectric sensor associated with the user interface surface, and a processing component coupled to the touch-sensitive sensor and the piezoelectric sensor. The touch-sensitive sensor produces a touch-sensitive signal in response to an actuation of the touch-sensitive sensor at the user interface surface. The piezoelectric sensor produces a piezoelectric signal in response to an actuation of the piezoelectric sensor at the user interface surface. The processing component determines whether actuation of the touch-sensitive sensor is invalid based on the touch-sensitive signal and the piezoelectric signal. The processing component also performs, or refrains from performing, an operation of the electronic device in response to determining that the actuation of the touch-sensitive sensor is invalid.

Another aspect is a method of operating an electronic device having a touch-sensitive sensor, a piezoelectric sensor and a processing component. An actuation of the touch-sensitive sensor is detected, and a touch-sensitive signal is produced by the touch-sensitive sensor in response to detecting the actuation of the touch-sensitive sensor. Also, an actuation of the piezoelectric sensor is monitored, and a piezoelectric signal is produced by the piezoelectric sensor in response to detecting the actuation of the piezoelectric sensor. Next, a determination is made about whether the actuation of the touch-sensitive sensor is invalid based on the touch-sensitive signal and the piezoelectric signal. An operation of the electronic device is then performed, or refrained from performing, in response to determining that the actuation of the touch-sensitive sensor is invalid.

Referring to FIG. 1, there is illustrated a perspective view of an example electronic device 100. The device 100 may be any type of device capable of providing touch screen interactive capabilities. Examples of the electronic device 100 include, but are not limited to, electronic device, wireless devices, tablet computing devices, personal digital assistants, personal navigation devices, touch screen input device, touch or pen-based input devices, portable video and/or audio players, and the like. It is to be understood that the electronic device 100 may take the form of a variety of form factors, such as, but not limited to, bar, tablet, flip/clam, slider and rotator form factors.

For one embodiment, the electronic device 100 has a housing 101 comprising a front surface 103 which includes a visible display 105 and a user interface. For example, the user interface may be a touch screen including a touch-sensitive surface that overlays the display 105. For another embodiment, the user interface or touch screen of the electronic device 100 may include a touch-sensitive surface supported by the housing 101 that does not overlay any type of display. For yet another embodiment, the user interface of the electronic device 100 may include one or more input keys 107. Examples of the input key or keys 107 include, but are not limited to, keys of an alpha or numeric keypad or keyboard, a physical keys, touch-sensitive surfaces, mechanical surfaces, multipoint directional keys and side buttons or keys 107. The electronic device 100 may also comprise apertures 109, 111 for audio output and input at the surface. It is to be understood that the electronic device 100 may include a variety of different combination of displays and interfaces.

The electronic device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. Wherever the sensor or sensors 113 are supported by the housing 101, whether at the exterior boundary or within the exterior boundary, the sensor or sensors detect a predetermined environmental condition associated with an environment 117 external to the housing. Examples of the sensors 113 are described below in reference to FIG. 2.

Figure 2:
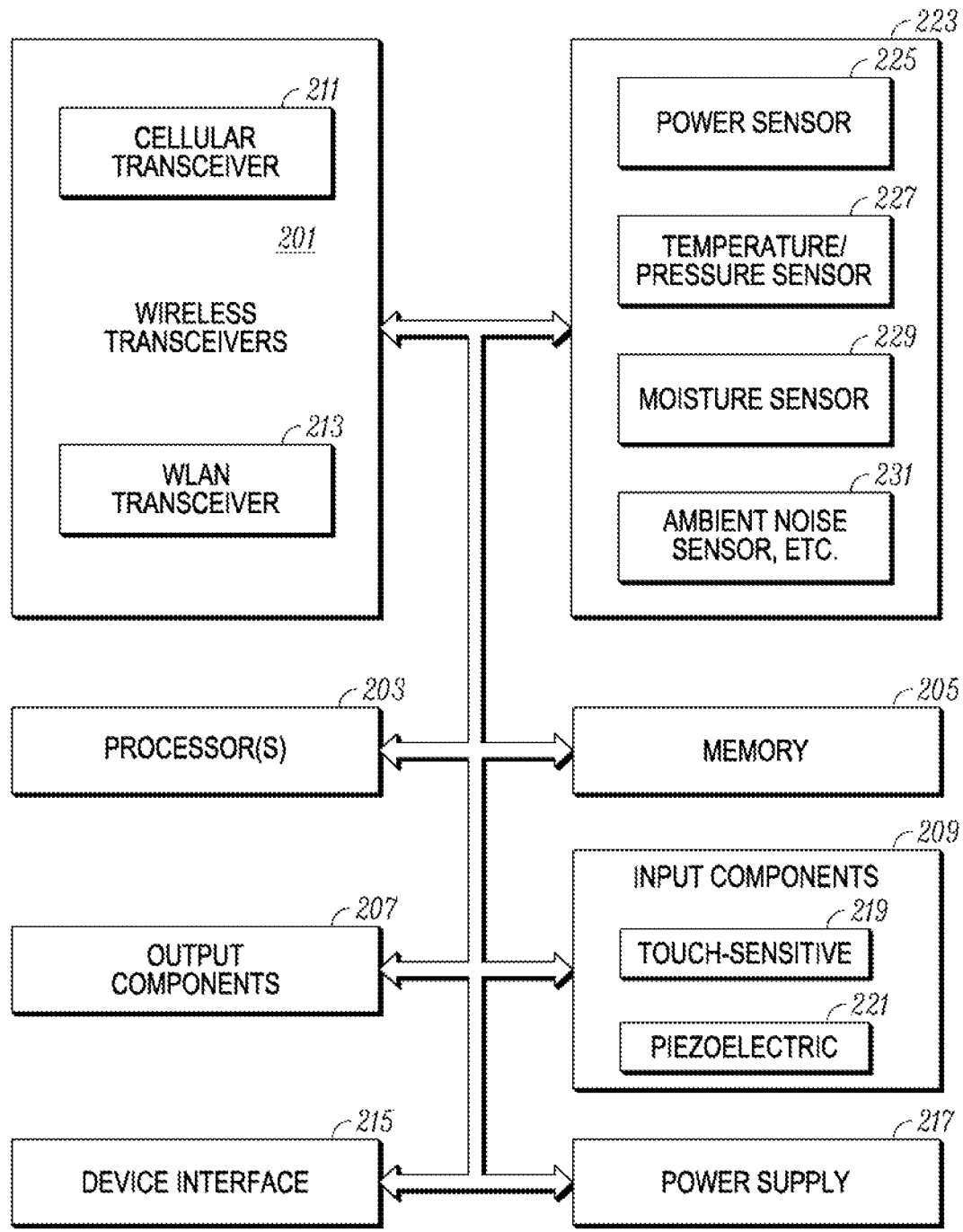
FIG. 2 is a block diagram illustrating various example components of the electronic device of FIG. 1.

Referring to FIG. 2, there is shown a block diagram representing example components 200 that may be used for an embodiment. The example embodiment may includes one or more wireless transceivers 201, one or more processors 203, one or more memories 205, one or more output components 207, and one or more input components 209. Each embodiment may include a user interface that comprises one or more output components 207 and one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, or IEEE 802.16) and their variants, as represented by cellular transceiver 211. Each wireless transceiver 201 may also utilize wireless technology for communication, such as, but are not limited to, peer-to-peer or ad hoc communications such as HomeRF, ANT, Bluetooth and IEEE 802.11 (a, b, g or n); and other forms of wireless communication such as infrared technology, as represented by WLAN transceiver 213. Also, each transceiver 201 may be a receiver, a transmitter or both.

The internal components 200 may further include a device interface 215 to provide a direct connection to auxiliary components or accessories for additional or enhanced functionality. In addition, the internal components 200 preferably include a power source or supply 217, such as a portable battery, for providing power to the other internal components and allow portability of the electronic device 100.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the electronic device, such as interaction among the components of the internal components 200, communication with external devices via each transceiver 201 and/or the device interface (see below), and storage and retrieval of applications and data to and from the memory 205. Each application includes executable code utilizes an operating system to provide more specific functionality for the electronic device. Data is non-executable code or information that may be referenced and/or manipulated by an operating system or application for performing functions of the electronic device.

The input components 209, such as a user interface, may produce an input signal in response to detecting a predetermined gesture at a first input component 219, such as a precision sensor. An example of a precision sensor is, but not limited to, a touch-sensitive sensor having a touch-sensitive surface substantially parallel to the display. The touch-sensitive sensor may include at least one of a capacitive touch sensor, a resistive touch sensor, an acoustic sensor, an ultrasonic sensor, a proximity sensor, or an optical sensor. In addition, the input components 209 may include one or more additional components, such as a second input component 221 such as a power efficient sensor. An example of a power efficient sensor is, but is not limited to, a piezoelectric sensor. The user interface surface may include a surface associated with both the first and second input components 219, 221. Examples of the user interface surface include a surface of a touch pad, a touch screen, piezoelectric sensor, and the like.

The input components 209 may also include other sensors, such as the visible light sensor, the motion sensor and the proximity sensor described above. Likewise, the output components 207 of the internal components 200 may include one or more video, audio and/or mechanical outputs. For example, the output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

Although the input components 209 described above are intended to cover all types of input components included and/or utilized by the electronic device, FIG. 2 provides a separate illustration of various sensors 223 that may be included and/or utilized by the device for emphasis. It is to be understood that, although the various sensors 223 are shown separate from the input components of 209, the various sensors are generally considered to be a part of the input components. The various sensors 223 may include, but are not limited to, one or more power sensors 225, one or more temperature sensors 227, one or more pressure sensors 227, one or more moisture sensors 229, and one or more motion sensors, accelerometer/Gyro sensors, and/or one or more other sensors, such as ambient noise sensors 231, light sensors, motion sensors, proximity sensors and the like.

The electronic device 100 has two or more user interfaces or sensors, such as first and second input components 219, 221, supported by the housing 101 which may be adaptively utilized separately or in conjunction with each other. For example, one sensor may provide different performance than another sensor under a particular environmental condition. In such case, signals or outputs from one or both sensors may be used to determine whether actuation of one of the sensors is invalid. Also, an operation of the device may be performed, or refrained from performing, in response to determining that the actuation of the sensor is invalid.

It is to be understood that FIG. 2 is provided for illustrative purposes only and for illustrating components of an electronic device in accordance with the present invention, and is not intended to be a complete schematic diagram of the various components required for a electronic device. Therefore, an electronic device may include various other components not shown in FIG. 2, or may include a combination of two or more components or a division of a particular component into two or more separate components, and still be within the scope of the present invention.

Figure 3:
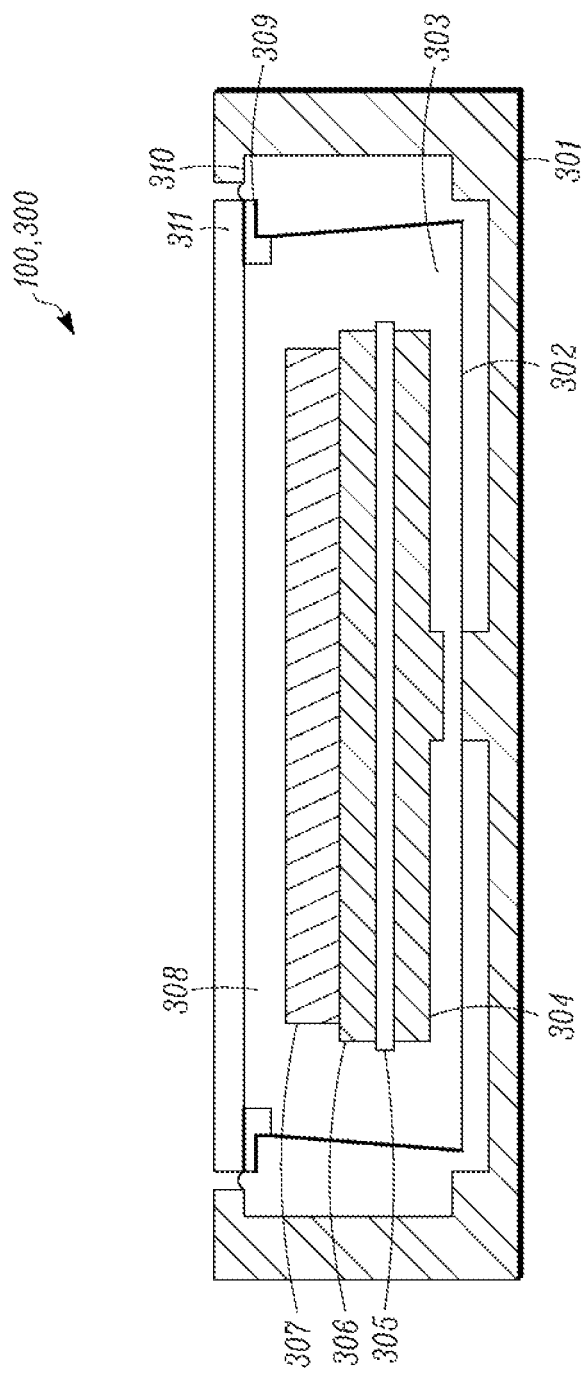
FIG. 3 is a cross-sectional diagram particularly showing the piezoelectric sensor and associated component portions of the electronic device of FIG. 1, taken along line 3-3' of FIG. 1.

Turning to FIG. 3, a cross-sectional view is provided of the electronic device 100 of FIG. 1, taken along a line 3-3 of FIG. 1, to illustrate in further detail several components 300 of the electronic device and, particularly, components associated with the first and second input components 219, 221. The cross-sectional view particularly illustrates how various components associated with the user interface are stacked up in relation to one another and in relation to a housing 301 of the electronic device 100. The cross-sectional view provides an illustration of a "module stackup". More particularly, as shown, the components 300 shown in FIG. 3 include not only the housing 301 but also a piezo frame 302, a design gap (clearance/tolerance) 303, one or more printed circuit board (PCB) components (Btm) 304, additional PCB component(s) (FR-4/Flex layers) 305, further PCB component(s) (top) 306, an organic light emitting diode (OLED) display component 307, a further design gap (travel) 308, a lens/piezo frame support 309, a seal gasket or simply gasket (which in some embodiments can also be an acoustic roll, particularly where speaker functionality of the touch screen assembly is envisioned) 310, and a floating top lens (or simply touchpanel lens) 311. In the present embodiment, the lens/piezo frame support 309 is integrally formed with, and constitutes an extension of, the piezo frame 302, although this need not be the case in some alternate embodiments, in which the two parts can be distinct components that are attached or coupled to one another. Notwithstanding that the display component 307 is an OLED display component in the present embodiment, in other embodiments other types of light emitting diode (LED) display components or other display components can be employed.

The assembly of the components 300 can be understood as one in which all of the respective elements 302, 303, 304, 305, 306, 307, 308, 309, 310, and 311 are stacked in succession between the element 301 (the housing) and the element 311 (the floating top lens). The lens/piezo frame support 309 links the floating top lens 311 with the piezo frame 302. Thus, the piezoelectric sensor may include a lens component and an arm component linking the lens component to a piezoelectric element, so that a first movement of the user interface surface results in a second movement of the piezoelectric element. The piezo frame 302 is a piezoelectric component connected with (in electrical communication with) other component(s) of the electronic device 100 such as the processor 203 of FIG. 2, and is capable of outputting electric signal(s) for use by other component(s) of the electronic device when pressure is applied to the floating lens 311. It is important to note that movement of the piezoelectric element is one of a bending, twisting, compression or expansion. A translation of the piezoelectric element will not necessarily result in a desired signal.

The piezoelectric component may be made of a piezoceramic material, for example. The piezoelectric component may also be a composite structure consisting of a piezoceramic material adhered to a carrier structure. The carrier structure would be used to carry, strengthen, and attach the piezoelectric component to other components such as the housing and the lens/piezo frame support, lens or display.

By virtue of the connection afforded by the lens/piezo frame support 309, pressure applied upon the floating top lens 311 tending to move that lens downward (toward the interior of the electronic device 100) tends to result in pressure being applied to the piezo frame (piezoelectric component) 302 that can trigger or otherwise actuate that piezoelectric component such that corresponding electric signal(s) are sent to the processor 203 and/or other component(s) of the electronic device 100. During normal operation of the electronic device 100, such electric signal(s) can be interpreted as signals intended to cause the electronic device (or components thereof) to take various actions or produce various consequences. For example, during normal operation of the electronic device 100 in some operational circumstances, pressure applied to the floating top lens 311 precipitating actuation of the piezo frame 302 (and corresponding output of an electric signal therefrom) can be interpreted as a command to initiate a telephone call, for example, by dialing a phone number that is already displayed on the touch screen.

The components 300 are designed to have low thicknesses so that the overall module stackup (and the electronic device 100) has a small or modest thickness. In the present example, the components 300 are designed such that the overall thickness of the overall assembly of the components (and thus the electronic device 100 itself) can be quite thin, with a total thickness of only about ten (10) millimeters. This is achieved when the respective elements 301, 302, 303, 304, 305, 306, 307, 308, 309, 310, and 311 have respective thicknesses of 1.000, 0.200, 0.050, 2.000, 1.000, 1.300, 2.000, 0.350, 1.000, 0.100, and 1.000 millimeters (such than the accumulated thickness of the overall assembly after adding each of the respective elements is 1.000.1.200, 1.250, 3.250, 4.250, 5.550, 7.550, 8.900, 9.000, and 10.000 millimeters, respectively). The thickness values are only examples, and the various thickness values can vary considerably depending upon the embodiment. For example, the thicknesses of the housing 301, additional PCB component(s) 304, 305 306, and lens/piezo frame support 309 can be further reduced in other embodiments. Also, notwithstanding the particular components 300 of the module stackup shown in FIG. 3, in other embodiments or applications one or more of these components can be eliminated and/or one or more other components can be added.

Given the above arrangement, the touch screen with the floating top lens 311 can be actuated, so as to actuate the piezo frame 302 such that electric signal(s) are generated thereby and sent to other component(s) of the electronic device 100) in a variety of circumstances. Examples of such actuations include those caused by a finger press such as when dialing, or answering a call, or weighing an object, or changing volume, or navigating virtual controls with the touch screen having a floating top lens 311. Also, the floating top lens 311 or the display 307 may include a non-piezo sensor or sensors, such as a touch sensor, integrated therein.

Figure 4:
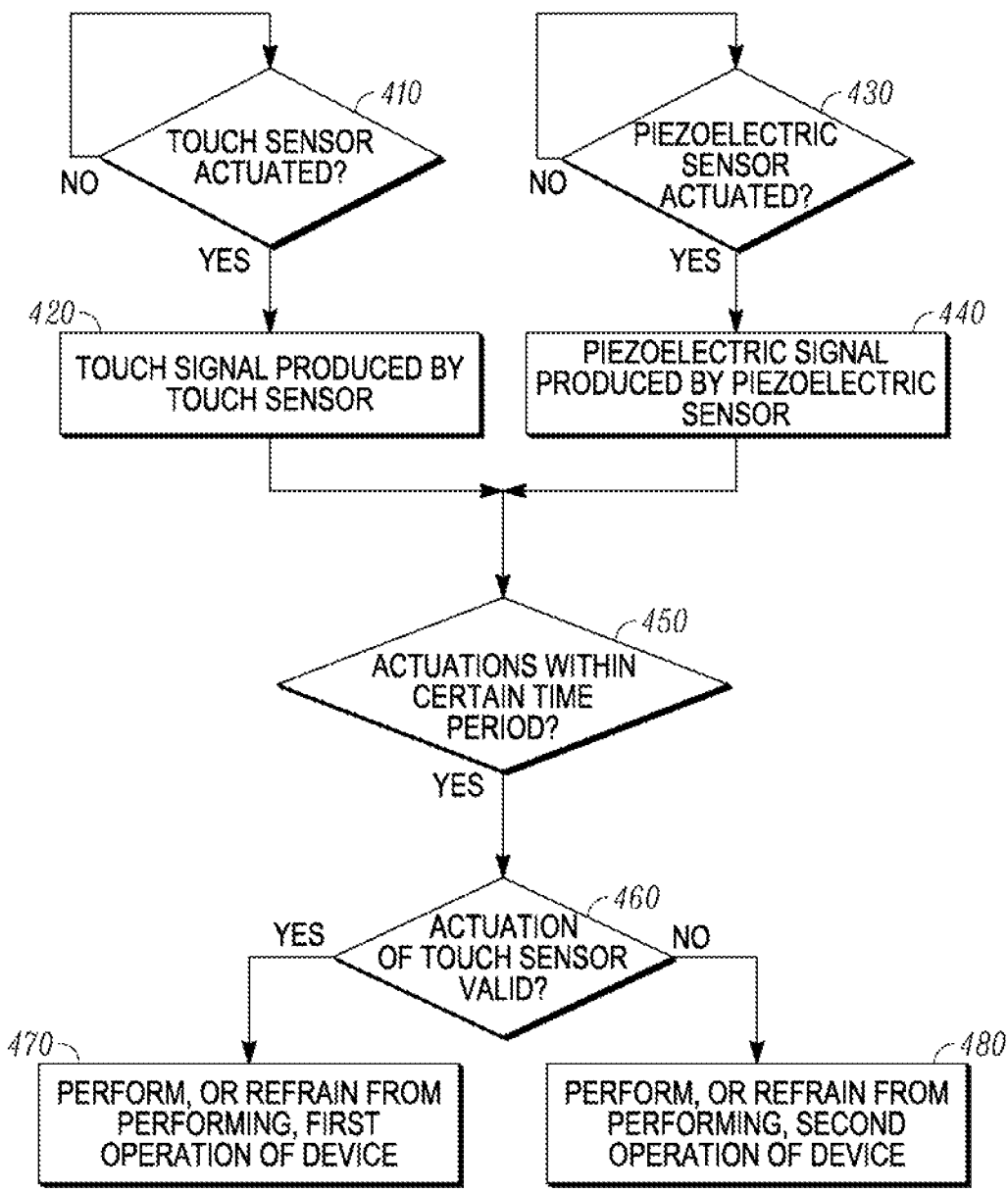
FIG. 4 is a flow diagram showing an example operation of the electronic device of FIG. 1.

Referring to FIG. 4, there is shown a flow diagram representing an example operation 400 of the electronic device 100. In particular, the example operation 400 represents a method of operating an electronic device having a touch-sensitive sensor, a piezoelectric sensor and a processing component. The operation 400 detects an actuation of the touch-sensitive sensor at step 410. The touch-sensitive sensor then produces a touch-sensitive signal in response to detecting the actuation of the touch-sensitive sensor at step 420. Also, the operation 400 detects an actuation of the piezoelectric sensor at step 430. The piezoelectric sensor then produces a piezoelectric signal in response to detecting the actuation of the piezoelectric sensor. It should be noted that the steps involving the touch-sensitive sensor and the piezoelectric sensor may act independently or concurrently. Thus, the operations of the touch-sensitive sensor may occur before, during or after the operations of the piezoelectric sensor, and vice versa.

Actuation of the touch-sensitive sensor and/or the piezoelectric sensor may occur in a variety of ways. For one embodiment, detecting the actuation of the touch-sensitive sensor includes detecting, monitoring or assessing user motion at or above a proximity of the user interface surface. For another embodiment, detecting the actuation of the piezoelectric sensor includes detecting a force against one or more areas of the user interface surface. For example, detecting the actuation of the piezoelectric sensor may include causing a second movement of the piezoelectric element in response to a first movement of the user interface surface. The user interface surface may include a lens component. An example of a lens component is a glass-based or plastic-based surface used to cover a portion of the electronic device, particularly a display or touchscreen.

After the touch-sensitive signal and the piezoelectric signal are produced at steps 420 and 440, the operation 400 may determine whether the actuations of the touch-sensitive sensor and the piezoelectric sensor occurred within a particular predetermined time period at step 450. Generally speaking, the actuations of the touch-sensitive sensor and the piezoelectric sensor are associated with a same user actuation, such as a common user gesture at or in proximity to both sensors. For example, the actuations of the touch-sensitive sensor and the piezoelectric sensor may be considered to be concurrent if both the touch-sensitive sensor and the piezoelectric sensor are actuated at steps 410, 430 within a predetermined time period or both the touch-sensitive signal and the piezoelectric signal are produced within the predetermined time period. The predetermined time period may vary, but should be relatively short from the perspective of the user, such as 1 second or less.

After the touch-sensitive signal and the piezoelectric signal are produced at steps 420 and 440, the operation 400 may determine whether the actuation of the touch-sensitive sensor is valid or invalid based on the touch-sensitive signal and the piezoelectric signal at step 460. For one embodiment, the determination of whether the actuation of the touch-sensitive sensor is valid or invalid may occur in response to the latter of the touch-sensitive signal being produced or the piezoelectric signal being produced. For another embodiment, the determination of whether the actuation of the touch-sensitive sensor is valid or invalid may occur in response to determining that the touch-sensitive signal and the piezoelectric signal are produced within a predetermined time period, such as 1 second or less.

Also, the operation 400 may determine that the touch-sensitive sensor is valid or invalid based on one or more environmental conditions at step 460. For one embodiment, determining that the actuation of the touch-sensitive sensor is invalid includes determining that the touch-sensitive signal is below a predetermined threshold. For example, during conditions of high moisture or humidity, conductive elements at or near the surface of the touch-sensitive sensor may reduce or minimize the accuracy of the sensor. Such moisture or humidity may come from a user's body, such as sweat, cosmetics or conductive jewelry, or from an environment about the user's body, such as rain, mist, external liquids or metals (such as metallic keys). For another example, during conditions of a non-conductive object, such as a gloved finger or non-conductive stylus, non-conductive elements at or near the surface of the touch-sensitive sensor may reduce or minimize the responsiveness of the sensor. For another embodiment, determining that the actuation of the touch-sensitive sensor is invalid includes determining that the touch-sensitive signal does not match any signals of a predetermined group of signals, such as situations caused by moisture on the touch-sensitive sensor.

If the operation 400 determines that the touch-sensitive sensor may be valid at step 460, the operation performs, or refrains from performing, a first operation of the electronic device at step 470. In particular, the operation 400 may perform, or refrain from performing, the first operation based on the touch-sensitive signal without, or with minimal, regard to the piezoelectric signal. For example, the electronic device 100 may perform operations based on the touch-sensitive signal, since the touch-sensitive sensor may have higher precision than the piezoelectric sensor. In such case, the piezoelectric sensor would continue to produce the piezoelectric signals so that the device 100 may monitor the validity or invalidity of the activations of the touch-sensitive sensor.

If the operation 400 determines that the touch-sensitive sensor may be invalid at step 460, the operation performs, or refrains from performing, a second operation of the electronic device, different from the first operation, at step 480. For example, the electronic device may perform, or refrain from performing, the second operation in response to determining that the actuation of the touch-sensitive sensor is invalid. For one embodiment, performing, or refraining from performing, the second operation of the electronic device includes modifying the operation of the electronic device based on the touch-sensitive signal and the piezoelectric signal in response to determining that the actuation of the touch-sensitive sensor is invalid. For example, the electronic device may perform a function, or refrain from performing the function, based on a piezoelectric signal indicating user interaction at a portion of the lens component and a part of the touch-sensitive signal associated with that same portion of the lens component. For another embodiment, performing, or refraining from performing, the operation of the electronic device includes modifying the operation of the electronic device based on the piezoelectric signal, without regard to the touch-sensitive signal, in response to determining that the actuation of the touch-sensitive sensor is invalid. For example, the electronic device may perform a function, or refrain from performing the function, based on the piezoelectric signal caused by user interaction even though the touch-sensitive signal indicates minimal interaction with the user. In some scenarios, even if the piezoelectric sensor has a lower precision than the touch-sensitive sensor, the electronic device 100 may rely in whole, or in part, to the piezoelectric signals due the invalidity of one or more actuations of the touch-sensitive sensor.

As stated above, the processing component may determine whether actuation of the touch-sensitive sensor is valid or invalid based on the touch-sensitive signal and the piezoelectric signal. For one embodiment, if the touch-sensitive signal indicates more user interaction at the lens component than the piezoelectric signal, then at least part of the touch-sensitive signal may be invalid (for example, due to excessive moisture) and the piezoelectric signal may be more reliable. The processing component may determine that the actuation of the touch-sensitive sensor is invalid based on a particular touch-sensitive signal failing to have a corresponding piezoelectric signal within a particular time frame, such as minimal indication of a concurrent piezoelectric signal corresponding to the touch-sensitive signal. Accordingly, the processing component refrains from performing the operation of the electronic device associated with the touch-sensitive signal, since touch-sensitive signal is not likely to be associated with a user input.

For another embodiment, if the piezoelectric signal indicates more user interaction at the lens component than the touch-sensitive signal, then at least part of the touch-sensitive signal may be invalid (for example, due to a gloved hand) and the piezoelectric signal may be more reliable. The processing component may determine that the actuation of the touch-sensitive sensor is invalid based on a particular piezoelectric signal failing to have a corresponding touch-sensitive signal within a particular time frame, such as minimal indication of a concurrent touch-sensitive signal corresponding to the piezoelectric signal. Accordingly, the processing component performs the operation of the electronic device associated with the piezoelectric signal, since the piezoelectric signal is likely to be associated with a user input alluding detection by the touch-sensitive sensor.

There may be other instances, other than normal conditions, when the touch-sensitive signal may be preferable to the piezoelectric signal. For still another embodiment, if a motion sensor of the electronic device detects movement above a certain threshold, then the touch-sensitive signal may be more reliable than the piezoelectric signal. In either of the two above embodiments, when it is determined that there is a problem with the touch-sensitive signal, and the piezoelectric signal is used solely for input, the touch sensitive circuitry can be deactivated to save power. Also, when it is determined by other sensors that user is moving beyond a certain threshold, the piezoelectric signal might be used over touch-sensitive signal for better touch registration and prediction. For example, when a user is running, the user is likely to sweat. Thus, a device sensor, such as an accelerometer or pedometer detecting motion, a GPS detecting speed, and the like, may determine that the user may be running. For this example, the device may predict that the user is sweating and prefer the piezoelectric sensor over the touch-sensitive sensor. As another example, the device sensor may determine that the user may be running and prefer the piezoelectric sensor over the touch-sensitive sensor, because the piezoelectric sensor is more convenient for the user when he or she is in-motion.

It should be appreciated from the above that electronic devices and/or other electronic or other devices configured for operation as described above (or similar to the manners described above) are advantageous in their operation. A variety of failures to produce intended consequences of such actuations can be avoided or reduced when the devices are operated to recognize invalid actuations as such, and to adapt accordingly. Relatedly, users' experiences with their devices are enhanced because the users can utilize their devices with greater confidence that the users' motions in their everyday lives will be less likely to trigger electronic device operations in a manner that is unintentional or not desired.

It is specifically intended that the present disclosure not be limited to the embodiments and illustrations contained herein, but include modified forms of those embodiments including portions of the embodiments and combinations of elements of different embodiments as come within the scope of the following claims.

While the preferred embodiments of the disclosure have been illustrated and described, it is to be understood that the disclosure is not so limited. Numerous modifications, changes, variations, substitutions and equivalents will occur to those skilled in the art without departing from the spirit and scope of the present disclosure as defined by the appended claims.

What is claimed is:

1. An electronic device comprising:
    a user interface surface;
    a touch-sensitive sensor associated with the user interface surface, the touch-sensitive sensor producing a touch-sensitive signal in response to an actuation of the touch-sensitive sensor at the user interface surface;
    a piezoelectric sensor associated with the user interface surface, the piezoelectric sensor producing a piezoelectric signal in response to an actuation of the piezoelectric sensor; and
    a processing component coupled to the touch-sensitive sensor and the piezoelectric sensor, the processing component configured to:
        determine whether actuation of the touch-sensitive sensor is invalid based on both the touch-sensitive signal and the piezoelectric signal, the determining including comparing an indication of actuation at the user interface surface measured by the touch-sensitive signal with an indication of actuation at the user interface surface measured by the piezoelectric signal, the comparison demonstrating:
            that the touch-sensitive signal indicates more user interaction than is indicated by the piezoelectric signal; or
            that the piezoelectric signal indicates more user interaction than is indicated by the touch-sensitive signal; and
        perform, or refrain from performing, an operation of the electronic device in response to determining that the actuation of the touch-sensitive sensor is invalid.

2. The electronic device of claim 1, wherein the user interface surface is a surface of a touch pad or a touch screen.

3. The electronic device of claim 1, wherein the touch-sensitive sensor is at least one of a capacitive touch sensor, a resistive touch sensor, an acoustic sensor, an ultrasonic sensor, a proximity sensor, or an optical sensor.

4. The electronic device of claim 1, wherein the actuation of the touch-sensitive sensor includes detections of user motion at or above a proximity of the user interface surface.

5. The electronic device of claim 1, wherein the actuation of the piezoelectric sensor includes detections of a force against one or more areas of the user interface surface.

6. The electronic device of claim 1, the processing component further configured to modify the operation of the electronic device based on the touch-sensitive signal and piezoelectric signal in response to determining that the actuation of the touch-sensitive sensor is invalid.

7. The electronic device of claim 1, the processing component further configured to modify the operation of the electronic device based on the piezoelectric signal, without regard to the touch-sensitive signal, in response to determining that the actuation of the touch-sensitive sensor is invalid.

8. A method of operating an electronic device having a touch-sensitive sensor, a piezoelectric sensor and a processing component, the method comprising:
    detecting an actuation of the touch-sensitive sensor;
    producing a touch-sensitive signal by the touch-sensitive sensor in response to detecting the actuation of the touch-sensitive sensor;
    monitoring for an actuation of the piezoelectric sensor;
    producing a piezoelectric signal by the piezoelectric sensor in response to detecting actuation of the piezoelectric sensor;
    determining whether the actuation of the touch-sensitive sensor is invalid based on both the touch-sensitive signal and the piezoelectric signal, the determining including comparing the actuation measured by the touch-sensitive signal with the actuation measured by the piezoelectric signal, the comparison demonstrating:
        that the touch-sensitive signal indicates more user interaction than is indicated by the piezoelectric signal; or that the piezoelectric signal indicates more user interaction than is indicated by the touch-sensitive signal; and performing, or refraining from performing, an operation of the electronic device in response to determining that the actuation of the touch-sensitive sensor is invalid.

9. The method of claim 8, wherein detecting the actuation of the touch-sensitive sensor includes detecting user motion at or above a proximity of the user interface surface.

10. The method of claim 8, wherein monitoring the actuation of the piezoelectric sensor includes monitoring for a force against one or more areas of the user interface surface.

11. The method of claim 8, wherein performing, or refraining from performing, the operation of the electronic device further includes modifying the operation of the electronic device based on the touch-sensitive signal and the piezoelectric signal in response to determining that the actuation of the touch-sensitive sensor is invalid.

12. The method of claim 8, wherein performing, or refraining from performing, the operation of the electronic device further includes modifying the operation of the electronic device based on the piezoelectric signal, without regard to the touch-sensitive signal, in response to determining that the actuation of the touch-sensitive sensor is invalid.

* * * * *